Aug. 5, 1941.  C. L. EKSERGIAN  2,251,668
BRAKE MECHANISM
Filed July 19, 1939   2 Sheets-Sheet 1

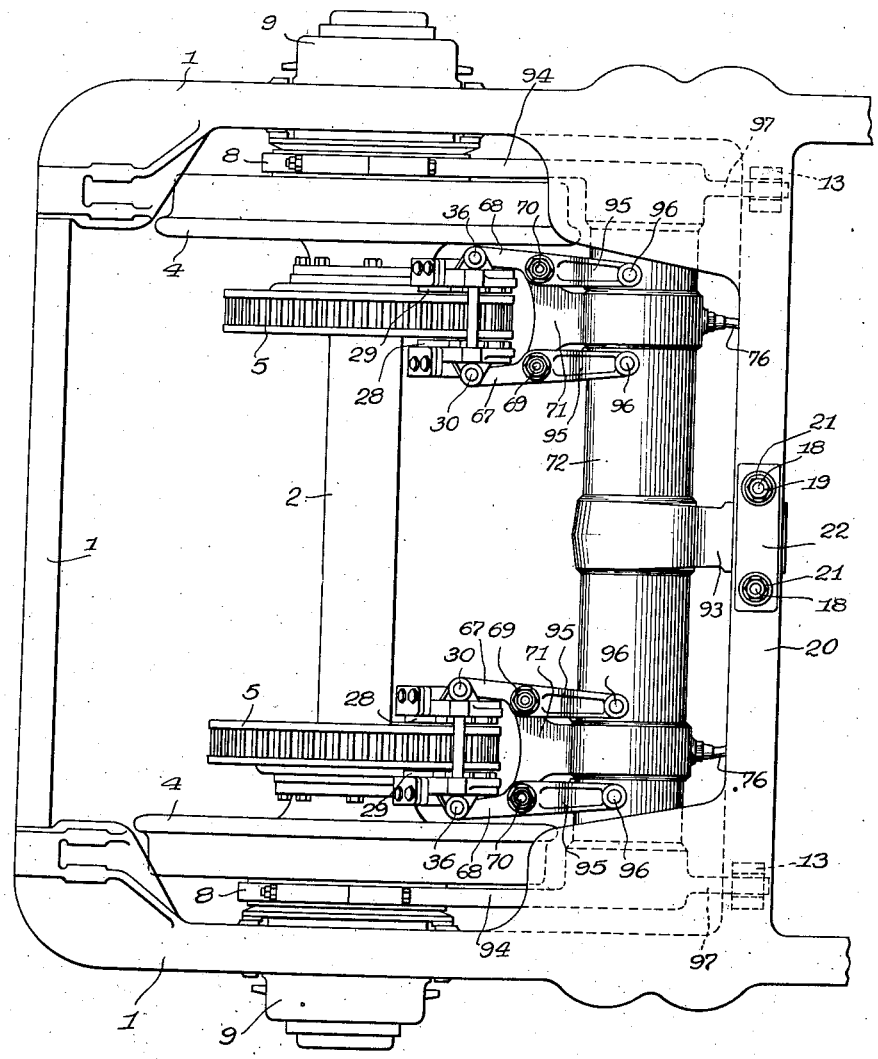

INVENTOR:
Carolus L. Eksergian
BY John P. Barby
ATTORNEY

Patented Aug. 5, 1941

2,251,668

UNITED STATES PATENT OFFICE 2,251,668

BRAKE MECHANISM

Carolus L. Eksergian, Detroit, Mich., assignor to Budd Wheel Company, Philadelphia, Pa., a corporation of Pennsylvania Application July 19, 1939, Serial No. 285,270

7 Claims. (Cl. 188—153)

The present invention relates to brakes and means for mounting and operating the same.

More specifically it relates to brakes of the type disclosed in copending case Serial No. 198,398, filed March 28, 1938, for Brake construction, now Patent No. 2,228,818, issued January 14, 1941.

In the said former design, bearings were provided on that portion of the axle lying between the wheels, which was entirely satisfactory in operation and construction, but somewhat more expensive to make, particularly when applied to live axles, and also might give rise to additional difficulties of maintenance, since the bearings are relatively less accessible because of their location between the wheels, and furthermore cause added difficulty in sealing the bearings against leakage of oil.

In the present construction, the bearings for the brake structure are placed outside the wheels, and, therefore, can be applied readily to standard live axles. The bearings for the present brake supporting means are arranged around the journal boxes.

In another copending case, Serial No. 270,750, filed April 29, 1939, now Patent No. 2,236,898, issued April 1, 1941, a cross piece is provided to form a part of a brake-supporting yoke, and individual brake cylinders are mounted thereon, each cylinder being of the single-acting type and so arranged that both the cylinder and the piston move, in opposite directions, to actuate the brakes. In accordance with the present invention, this construction is further modified by dispensing entirely with separately constructed brake cylinders, and using the cross piece itself as a brake cylinder or plurality of brake cylinders, preferably housing several pairs of pistons, so that it thus serves the double purpose of a rigid yoke member and of a number of cylinders, the word number being used here in the mathematical sense, to include unity as well as other numbers.

When the tubular cross piece is thus used as a cylinder, it may be preferable in certain cases to increase its diameter somewhat over what would be used merely to assure rigidity of the cross piece, its bore depending upon the force it is desired to generate by the pistons, but even when its diameter is thus increased, the invention is still productive of all its advantages, and economy of both space and material is made possible, without loss of effectiveness or strength.

In the preferred form, the diameter of the tube forming the cross piece may be of the same order of magnitude as the diameter of the brake cylinders at present commonly used, and as an example, four pistons may be housed within the said tube, two adjacent each brake ring. This construction not only economizes space but also materially decreases the complexity of the device and the number of parts otherwise involved, since, as stated, the tubular brake yoke member thus performs also the function of one or more compressed air cylinders. It will be understood that with this construction the longitudinal extent of the braking assembly may be reduced practically to a minimum.

Other objects and advantages of the invention in part will be particularly pointed out in the present specification and the drawings accompanying the same, and in part will be self-evident therefrom.

In said drawings, which illustrate one embodiment of the present invention,

Fig. 3 is a fragmentary plan view showing one end of a truck with the invention applied thereto.

Figure 1:
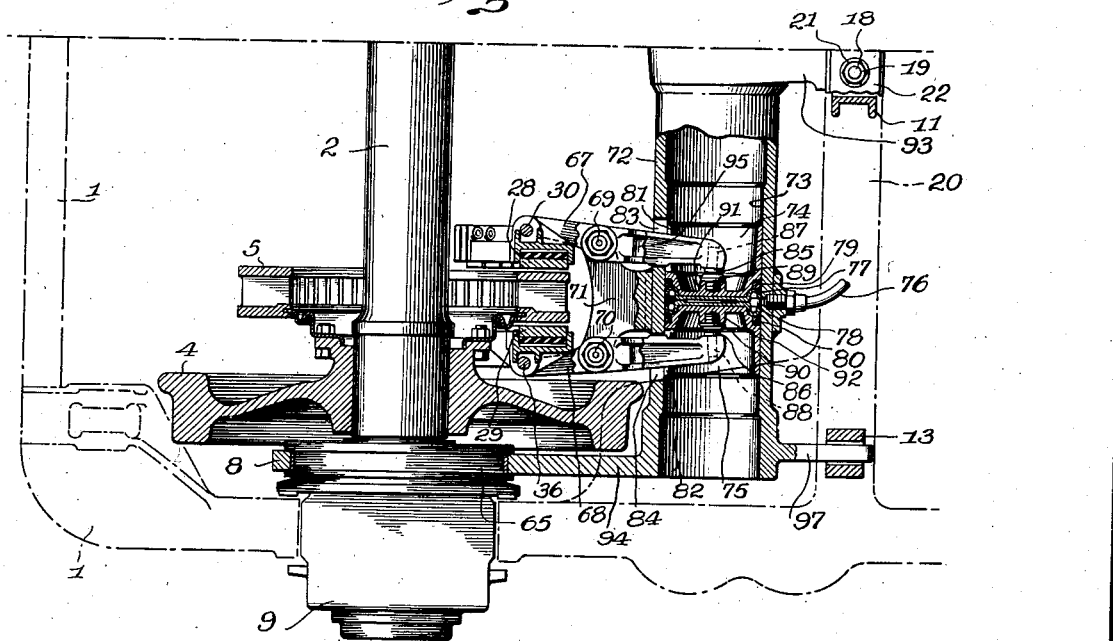
Fig. 1 is a diagrammatic partly sectional plan view of one longitudinal half of a truck embodying the invention; it will be understood of course that all the parts shown are duplicated symmetrically above the center line, which forms the upper boundary of this figure.

Referring now to the drawings, there is illustrated the axle 2, mounted in the truck 1 by means of the bearings in journal boxes 9. Said axle 2 carries a wheel 4 at each end as well as a cooperating brake ring 5. Brake shoes 28 and 29 are arranged on opposite sides of each brake ring 5, and are actuated by the levers 67 and 68, which are pivoted at 69 and 70 respectively, on a bracket 71 preferably carried by the tubular beam 72.

The lever 67 is pivoted to the brake shoe 28 by means of a rod or pin 30 and the lever 68 is similarly pivoted to the brake shoe 29 by means of the rod or pin 36. The tube 72 has a bore 73 to receive pistons 74 and 75, which are arranged normally, that is, when not subjected to air pressure, in substantial contact with one another and positioned on opposite sides of the air supply pipe 76. Each piston may have a flexible sealing member, 77 and 78 respectively, and in addition may have a piston ring such as 79 and 80.

Each piston has a slot in its sleeve portion, as indicated at 81 and 82 and suitable apertures 83 and 84 are provided in the wall of the tube 72 to pass the long arms of the levers 67 and 68, which terminate in abutments 85 and 86, suitably mounted thereon, for example, by means of the stems 87 and 88, received in corresponding bores in the ends of the levers.

Cooperating abutments 89 and 90 may be carried by lugs 91 and 92 of the pistons, so that when air under pressure is applied through the pipe 76 and the pistons 74 and 75 are forced apart thereby, by acting on the long arms of the levers 67 and 68 the said abutments will force the brake shoes 28 and 29 into contact with the opposite faces of the brake ring 5, thus producing the desired braking effect.

The tube 72 has a rearwardly extending arm 93 which extends through the yoke 11, which is supported from the cross member 20 of the truck in any suitable way, for example, by the bolt 18, threaded at 19, and having a bearing plate 22 thereon, a nut 21 serving to retain the parts in position. The arm 93 may thus be mounted in rubber or other resilient means, as disclosed in detail in the copending case Serial No. 270,750, above referred to. It will be seen that the arm 93 is very short, since it need extend only from the tube 72 through the yoke 11.

The tube 72 is supported from bearings around the journal boxes 9, for this purpose having at each end an arm 94 mounted in a groove 65 on the adjacent journal box 9. A strap 8 serves to secure the arm 94 in its proper place by means of the bolts and nuts 66.

Figure 2:
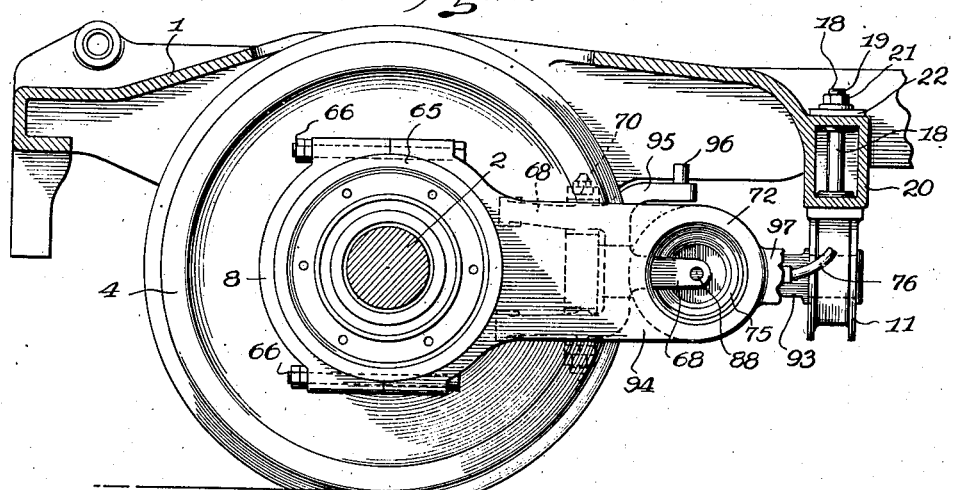
Fig. 2 is a partly sectional elevation of the structures shown in Fig. 1.

In order to provide an emergency hand brake for use with the present air brake, it is preferred to provide rearwardly extending arms such as 95 (Fig. 2) projecting from the levers 67 and 68, and which carry the pivots 96 for supporting the links of the hand brake mechanism, which in other respects may be made in any preferred way.

The reason for providing the rearwardly extending arms such as 95 is to give sufficient power to the hand brakes, because the rearmost portions of the levers 67 and 68 are of course inaccessible for this purpose since they are housed within the tubular member 72. The tubular member 72 may have at one or both ends a rearwardly extending arm 97, these arms being received in the yokes 13 and accomplishing the function of preventing the brake yoke from dropping in case the arm 93 fails, since the brake mechanism then still will be supported by the arms 97.

The operation of the present invention is as follows:

When air under pressure is supplied through the pipes 76, the air will enter the spaces between the pistons 74 and 75, forcing them apart. The abutments 89 and 90, bearing against the long arms of the levers 67 and 68, will force them apart, thus causing the short arms of the said levers to push the brake shoes 28 and 29 against the opposite faces of the corresponding brake ring 5.

Since both pistons are of the same size and have the same air pressure acting thereon, their braking efforts automatically will be equal, thus dispensing with the need of any equalizing devices, that might otherwise be requisite, and this is true regardless of the number of pistons employed in any given embodiment, so that it is clear that all the brake rings will receive equal pressures from their respective brake shoes.

While a preferred form of the invention has been disclosed here in detail, it should be clearly understood that the said disclosure is provided solely in an illustrative sense, and not in any way as a limitation of the invention. Since various changes may be made without departing from the spirit of the invention, the scope of the same is to be determined solely from the following claims.

I claim:

1. A brake mechanism comprising a wheel and axle, a brake ring connected therewith, brake shoes in cooperative relation with the opposite faces of the said ring, a brake yoke pivotally supported about the axis of the axle, the said yoke including a tubular cross piece, means for preventing the yoke from turning about the said axis, and pressure-fluid actuated mechanism carried by the brake yoke, comprising two members slidable in the bore of the cross piece, movable in opposite directions, and connected one to each brake shoe, whereby fluid pressure applied between the said members will cause both brake shoes to engage the said brake ring, the axis of the axle and that of the cross piece being in the same plane.

2. A brake mechanism comprising a wheel and axle, a brake ring connected therewith, brake shoes in cooperative relation with the opposite faces of the said ring, a brake yoke pivotally supported about the axis of the axle, the said yoke including a tubular cross piece, means for preventing the yoke from turning about the said axis, and pressure-fluid actuated mechanism carried by the brake yoke, comprising two pistons fitting movably in the bore of the cross piece, means for supplying pressure fluid between the pistons, to cause them to move in opposite directions, two levers pivoted to the yoke and connected one to each piston and to the corresponding brake shoe, whereby such movement of the pistons will cause both brake shoes to engage the said brake ring.

3. In a brake mechanism, a truck having an axle, a wheel mounted thereon, a brake member rotating with said wheel, a brake shoe adjacent said member, a support for said shoe mounted on said axle and a portion of the truck remote therefrom, means for forcing said shoe against the rotary member, comprising a cylinder serving as a stress-carrying structural part of the support and having the axis of its bore substantially parallel to the axis of the axle, and a piston therein, having means connecting it operatively to the brake shoe.

4. In a brake mechanism, a truck having an axle, a wheel mounted thereon, a brake member rotating with said wheel, a brake shoe adjacent said member, a support for the shoe and means for forcing said shoe against the rotary member, comprising a cylinder serving as a stress-carrying structural part of the support and having the axis of its bore substantially parallel to the axis of the axle, and a piston therein, having means connecting it operatively to the brake shoe, said cylinder having supporting arms extending from its ends, and pivoted about the axis of the axle.

5. In a brake mechanism, a truck having an axle, a wheel mounted thereon, a brake member rotating with said wheel, a brake shoe adjacent said member, means for forcing said shoe against the rotary member, comprising a cylinder having the axis of its bore substantially parallel to the axis of the axle, and a piston therein, having means connecting it operatively to the brake shoe, said cylinder having supporting arms extending from its ends, and pivoted about the axis of the axle, said cylinder serving also as a support upon which the above-named means connecting the piston to the brake shoe are mounted.

6. In a brake mechanism, a truck having an axle, a wheel mounted thereon, a brake member rotating with said wheel, a brake shoe adjacent said member, means for forcing said shoe against the rotary member, comprising a cylinder having the axis of its bore substantially parallel to the axis of the axle, a piston therein, having means connecting it operatively to the brake shoe, said cylinder having supporting arms extending from its ends, and pivoted about the axis of the axle, said cylinder serving also as a support upon which the above-named means connecting the piston to the brake shoe are mounted; and means on the truck for preventing the cylinder from turning about its pivot.

7. In a brake mechanism for trucks comprising a frame supported by a wheel and axle assembly, a brake member rotatable with a wheel of said assembly, a brake shoe in cooperative relation to said rotatable brake member, a support for said shoe including a transverse beam supported at its ends by the wheel and axle assembly and intermediate the ends of the truck frame, and means for forcing the shoe against the rotatable member to effect the braking, said means comprising a cylinder the walls of which form a structural stress-carrying part of said beam, a piston in said cylinder, and means connecting said piston operatively to the brake shoe.

CAROLUS L. EKSERGIAN.